Aug. 26, 1930.  A. O. BOWEN ET AL  1,773,806
HEATER
Filed May 15, 1929.  2 Sheets-Sheet 2

A. O. Bowen
D. J. Bowen
INVENTOR

BY Victor J. Evans
ATTORNEY

Patented Aug. 26, 1930

1,773,806

UNITED STATES PATENT OFFICE

ALBERT O. BOWEN AND DANIEL J. BOWEN, OF ST. CHARLES, ILLINOIS, ASSIGNORS TO ERNEST A. CONAWAY, OF LITTLE ROCK, ARKANSAS

HEATER

Application filed May 15, 1929. Serial No. 363,264.

This invention relates to improvements in heaters particularly adapted though not necessarily limited in its use with steam heating systems, hot water heating systems or the like, and one of the objects of the invention is to improve and simplify heaters of this character and to provide an improved heating apparatus whereby steam or hot water may be produced with a minimum amount of fuel and at a very low cost.

It has been found in practice that compressed air contained in an hermetically sealed container can be quickly heated by means of a heating element also located within the container, and that a very high degree of heat will be produced in a minimum amount of time and with a minimum amount of heat, and which heat can be effectively used in the production of steam and hot water. The attainment of this end is therefore another object of the present invention.

A further object of the invention is to provide in an improved heater of this character a plurality of electric heating elements, so arranged, grouped or wired that they may be selectively rendered active or inactive for controlling the amount of heat generated thereby.

A further object is to provide an improved heater of this character which will be simple, durable, cheap and compact in construction and effective and efficient in operation.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention, and in which Figure 1 is a vertical sectional view through a heater of this character constructed in accordance with the principles in this invention.

Figure 1:
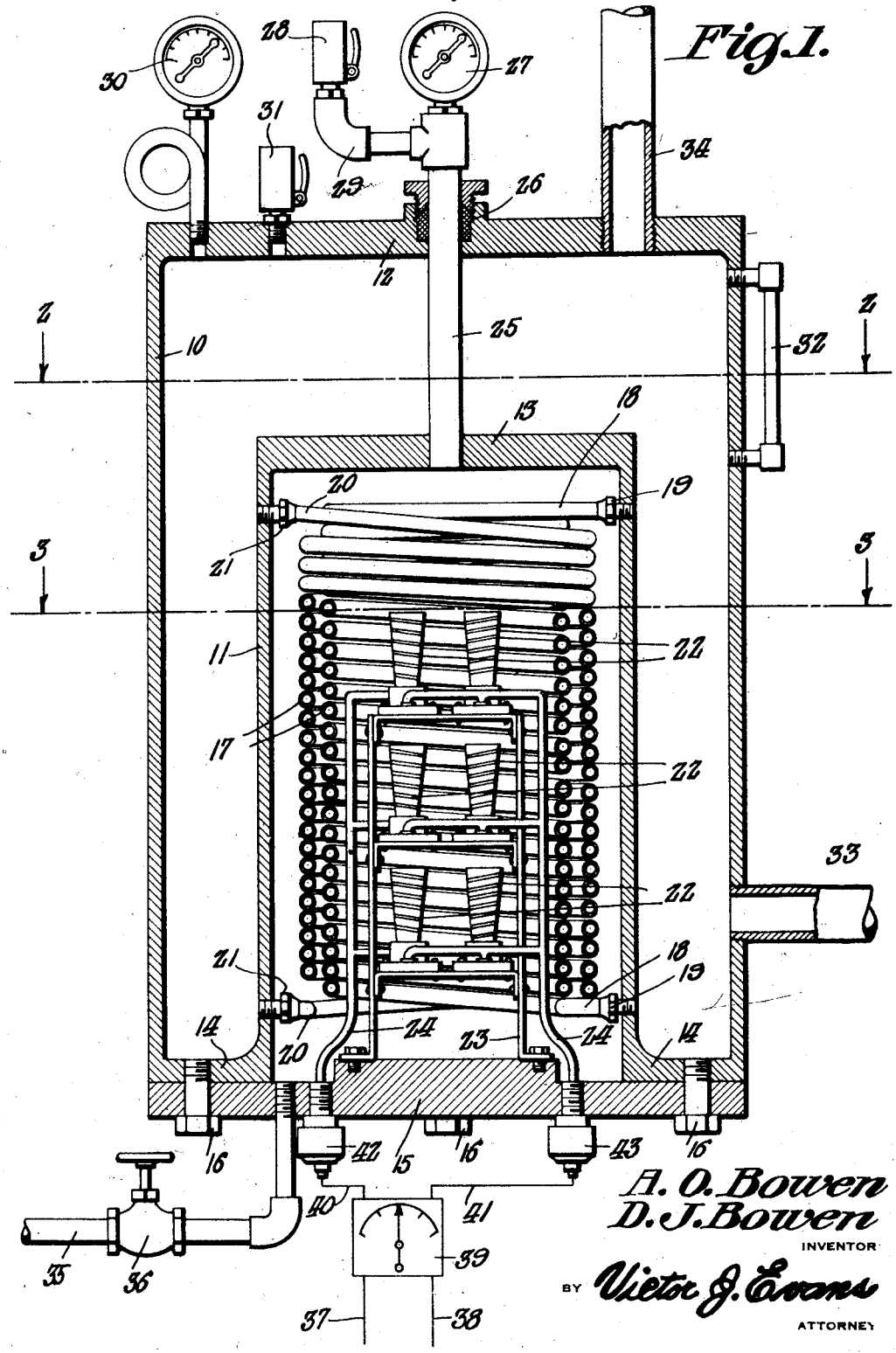
Figure 2:
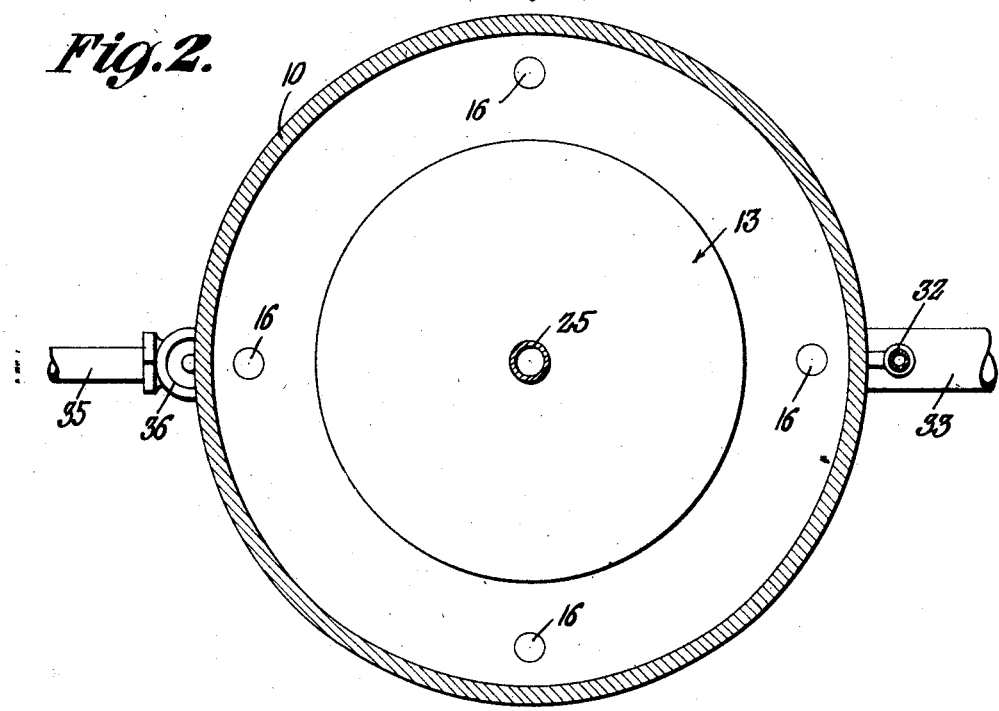
Figure 2 is a detail sectional view taken on line 2—2 Figure 1.
Figure 3:
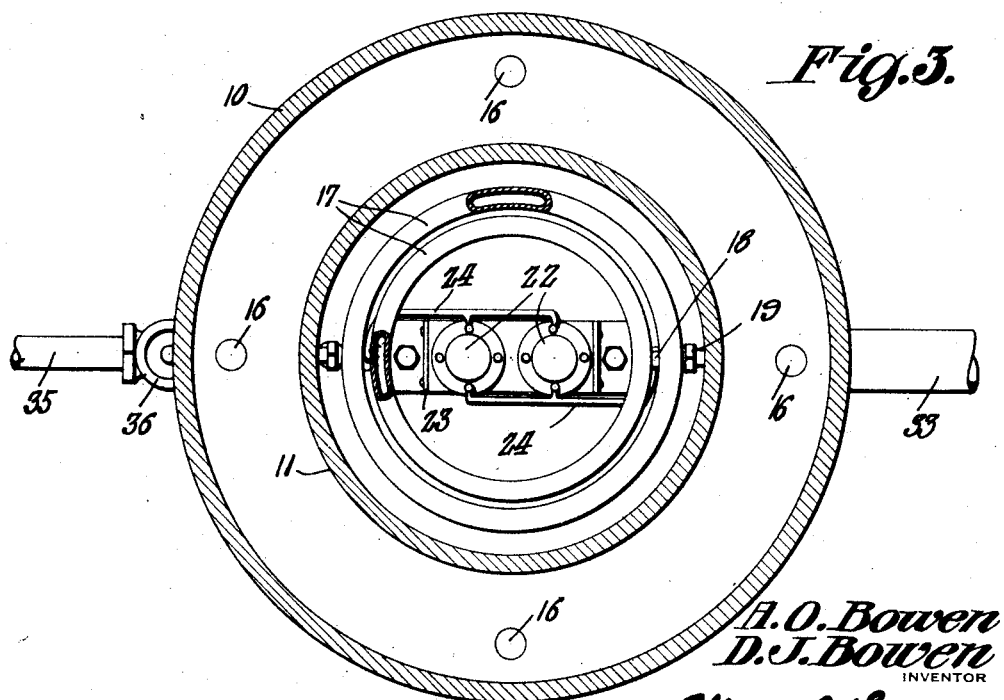
Figure 3 is a detail sectional view taken on line 3—3 Figure 1.

Referring more particularly to the drawings the numeral 10 designates generally an outer casing which may be of any desired size and configuration and constructed of any suitable material. Within the outer casing 10 is arranged another casing 11 which is of a size considerably smaller than the internal diameter of the casing 10. The casing 10 is closed at its top as at 12 and the casing 11 is also closed at its top as at 13. The bottom of the casing 10 is closed by means of a wall 14 arranged between the wall of the casing 11 and the wall of the casing 10.

The casing 11 is open at its bottom and a closure 15 is provided for the open end of the casing 11. This closure may be secured in position in any desired or suitable manner such as by means of fastening devices 16 so as to hermetically seal the inner casing or chamber 11.

With this construction it will be manifest that inasmuch as the inner casing 11 is of a size considerably smaller than the interior of the casing 10 there will be provided a water and steam space within the chamber 10 encompassing the chamber or casing 11.

Within the casing or chamber 11 is arranged pipes 17 preferably in the form of coils and any number of these coils may be provided.

In the present exemplification of the invention two of such coils are illustrated and they are arranged one within the other. The ends 18 of one of the coils are secured to the wall of the casing or chamber 11 by means of suitable couplings 19, while the ends 20 of the other coils are secured to the wall of the casing or chamber 11 by means of suitable coupling devices 21 so that the coils will each have communication with the water space between the walls of the casings 10 and 11, thereby permitting the water from the casing or chamber 10 to flow through the coils and back into the casing or chamber 10.

Arranged also within the chamber or casing 11 are a plurality of heating elements 22, any number of which may be provided and these heating elements are mounted upon a suitable structure 23, which latter is preferably secured to the closure 15 so that when the closure 15 is removed, if desired, the heating elements 22 may be withdrawn from the chamber or casing 11 as the closure 15 is displaced. Likewise when the closure 15 is placed in position the heating elements 22 will also be inserted in place preferably within the coils 17.

Any form of heating elements suitable for the purpose may be employed and these heating elements are connected together in any suitable manner either in groups, series or multiples, current being supplied to the elements through suitable conductors 24.

Leading from the interior of the chamber or casing 10 is a pipe 25 which preferably passes through a suitable packing 26 in one of the walls of the casing or chamber 10, preferably the top wall and connected with this pipe 25 is a pressure indicating gauge 27, and a safety relief valve 28 may also have communication with the pipe 25 through a suitable branch pipe 29.

A pressure gauge 30 may also be provided for the chamber or casing 10 and a safety relief valve 31 may also be provided. If desired a water gauge 32 may be provided for the chamber or casing 10.

Water is supplied to the chamber or casing 10 from any suitable source, preferably through a pipe 33 and preferably adjacent the bottom of the casing and the steam which is generated in the casing or chamber 10 may be conducted therefrom through a pipe 34 to any suitable source of use. Obviously a valve may be provided in the pipe 34 (not shown) for preventing the escape of the steam through the pipe 34 when it is not desired to use the steam.

It is necessary to supply only a predetermined amount of compressed air to the inner chamber or casing 11 from any suitable source, through a suitable pipe 35, in which pipe is arranged a cut off valve 36. After the air is supplied to this chamber 11, the valve 36 is closed to cut off the supply and this supply or quantity of compressed air is maintained in the chamber 11 and prevented from escaping.

Current may be supplied to the heating elements 22 in any desired or suitable manner but preferably from conductors 37—38 which may be connected with a controller 39, of any well known or suitable construction and leading from the controller are conductors 40—41 which are respectively connected with the communicating posts or terminals 42—43 on the ends of the conductors 24.

The controller 39 may be provided with a switch member 44 so that by adjusting the controller element 34 any desired number of the heating elements 22 may be cut in or cut out according to the amount of heat necessary or desired in the operation of the device.

It has been found in practice that by providing an hermetically sealed chamber, such as the chamber or casing 11, arranging the heating elements 22 therein, and forcing air into the chamber or casing 11, under pressure, and then rendering the heating elements active by completing the circuit through the elements, a considerable degree of heat can be obtained in a minimum amount of time and with a minimum amount of current so that the temperature of the water in the chamber or casing 10 will be rapidly raised or will be raised in a minimum amount of time.

The efficiency of the device is augmented by reason of the fact that although the chamber 11 is hermetically sealed and is out of communication with the interior of the chamber 10, the water in the chamber 10 circulates through the chamber 11 out of commingling relation with the heated air in the chamber 11, by flowing through the coils or pipes 17.

The chamber 11 is preferably of such a size as to contain a number of convolutions of the pipe so as to increase the heating surface, but it is of course to be understood that the invention is not to be limited in this respect.

It has been found in practice that after the temperature of the water in the chamber or casing 10 has been raised to the desired degree, it is possible to cut out or render inactive some of the heating elements 22, with the result that even though the amount of heat from the heating elements 22 has been reduced, the temperature of the water in the chamber 10 will be maintained for a considerable period of time. Therefore by the manipulation of the controller 39 the amount of heat can be controlled at will.

The controller 39 may be of any desired type, suffice it to say, that by the manipulation of the controller any one or more of the heating elements 22 may be cut in or out to render them active or inactive at will.

In the present form of the invention it will be seen the inner chamber 11 is heated to a high degree by means of the compressed air therein and the heating elements 22 and that the water in the coils 17 will be intensely heated so that a circulation will be induced in the coils and the liquid or fluid in the chamber 10 will enter the coils at their lowermost point and will be discharged back into the chamber 10 at the uppermost point in the coils, and the steam will escape through the pipe 34.

While the preferred form of the invention has been herein shown and described, it is to be understood that various changes may be made in the details of construction and in the combination and arrangement of the parts, within the scope of the claims, without departing from the spirit of this invention.

What is claimed as new is:—

1. A heater for use in a circulating heating system, said heater embodying a water chamber, means for maintaining a confined predetermined quantity of compressed air out of commingling relation with the contents of the water chamber, and means for heating said confined and compressed air for heating the water in the water chamber, the last-recited means embodying means for circulating water in the water chamber through the compressed and heated air and out of commingling relation therewith.

2. A heater for use in a circulating heating system, said heater embodying two chambers out of communication with each other, one of said chambers containing liquid, the other of said chambers being hermetically sealed, a heating element in the last said chamber, and means whereby the last said chamber may be supplied with a predetermined amount of compressed air.

3. A heater for use in a circulating heating system, said heater embodying two chambers out of communication with each other, one of said chambers containing liquid, the other chamber being hermetically sealed, a plurality of heating elements in the last said chamber, means whereby the last said chamber may be supplied with a predetermined amount of air under pressure, and means for selectively controlling the said heating elements at will.

4. The method of producing steam for a fluid circulating heating system which consists in confining compressed air to a predetermined area, then heating the air thus confined to raise the temperature thereof, and then subjecting the circulating fluid to such heated compressed air.

In testimony whereof we affix our signatures.

ALBERT O. BOWEN.
DANIEL J. BOWEN.